O. E. LUTZ.
CLUTCH.
APPLICATION FILED SEPT. 19, 1908.
906,041.
Patented Dec. 8, 1908.
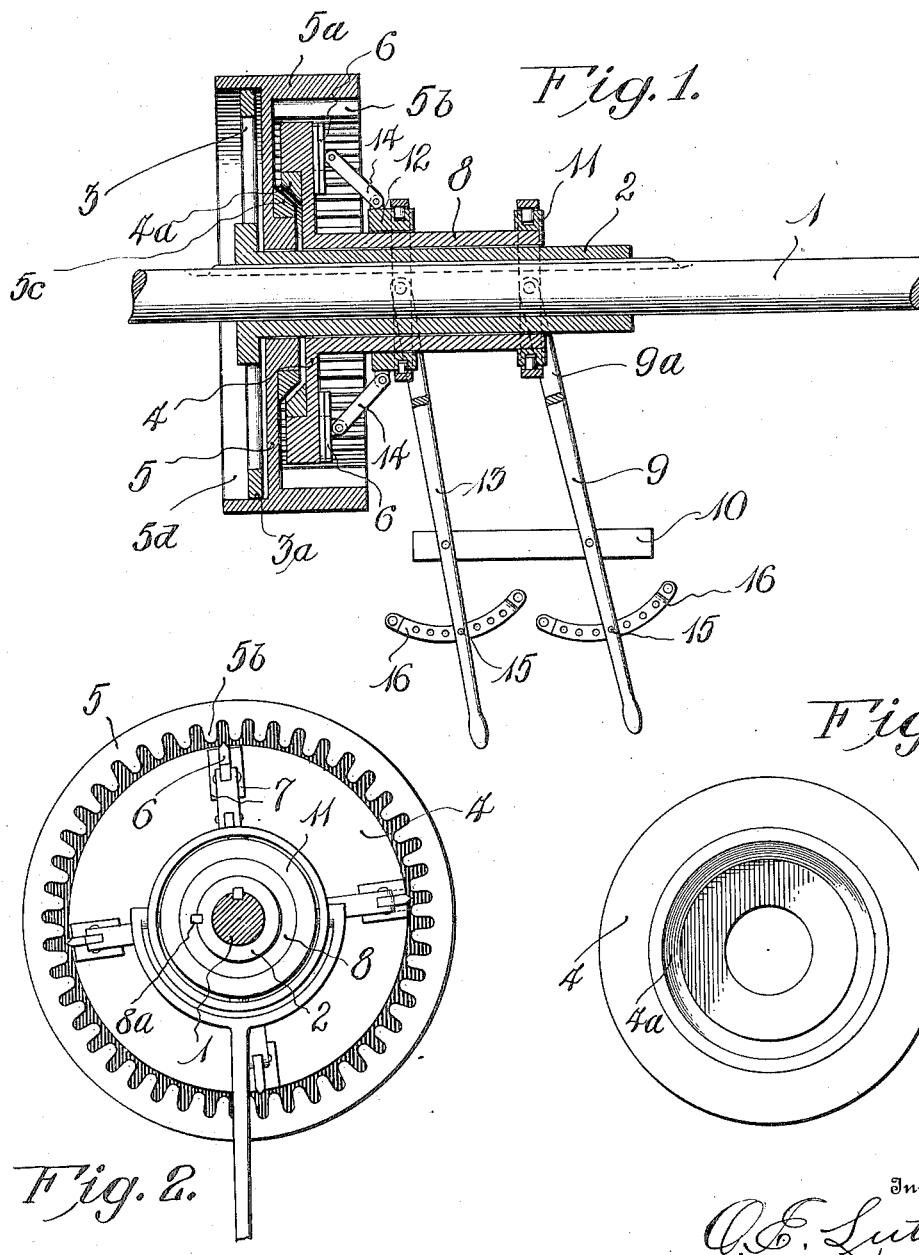

UNITED STATES PATENT OFFICE.

ORVILLE E. LUTZ, OF LAONA, WISCONSIN.

CLUTCH.

No. 906,041.     Specification of Letters Patent.     Patented Dec. 8, 1908.

Application filed September 19, 1908. Serial No. 453,861.

*To all whom it may concern:*

Be it known that I, ORVILLE E. LUTZ, a citizen of the United States, residing at Laona, in the county of Forest and State of Wisconsin, have invented certain new and useful Improvements in Clutches, of which the following is a specification.

This invention consists of novel improvements in what are commonly known as friction and toothed clutches.

The aim of the invention is to provide a clutch of the above type wherein a loose pulley is adapted to be operatively connected with a driving shaft by means of friction devices, and after once being connected is locked positively to the driving shaft by means of coöperating teeth and locking members.

A feature of the invention of special advantage is the provision of operating devices whereby the friction and toothed clutch means are adapted for independent operation.

For a full understanding of the invention, reference is to be had to the following detail description and the accompanying drawings, in which Figure 1 is a vertical sectional view of a clutch embodying the essential features of the invention; Fig. 2 is a side view of the clutch, and Fig. 3 is a detail view of the friction disk carrying the sliding lock members.

Throughout the following detail description and on the several figures of the drawings, similar parts are referred to by like reference characters.

Specifically describing the invention and referring particularly to the drawings, the numeral 1 denotes a driving shaft upon which is rigidly secured by any suitable means such as a key the hub or bushing 2. The hub 2 is provided at one end thereof with a friction rim or member 3 which is integral with the hub preferably and between which and the friction disk 4 is mounted a loose pulley 5. The pulley 5 is loose, as aforesaid, or freely rotatable on the hub 2 and is formed with the usual broad rim 5ª to receive a driving belt, not shown. The rim 5ª of the loose pulley 5 is provided with internally arranged teeth 5ᵇ which are adapted to be engaged by locking members in the form of blocks slidably mounted on the outer side of the friction disk 4. The blocks or locking members 6 are adapted for radial sliding movement, and each of said members is mounted between spaced guides 7 applied to the outer surface of the disk 4. The disk 4 is formed with an outstanding hub 8 by which said disk may be moved toward and from the adjacent side of the pulley 5. The disk 4 is operable by a lever 9 pivoted to a suitable support 10 and formed with a forked end 9ª connected with the grooved collar 11 on the hub 8. The collar 11 may be secured to the hub 8 by any suitable securing means such as set screws and it will be apparent that by shifting the lever 9 the hub 8 may be moved longitudinally with respect to the hub or bushing 2 on the shaft 1. The hub 8 is connected by a spline or key 8ª with the hub 2. The adjacent sides of the pulley 5 and the disk 4 are provided with friction surfaces 5ᶜ and 4ª respectively. On the hub 8 of the disk 4, and between said disk and the collar 11 is arranged a loose shiftable collar 12 grooved for connection with a second operating lever 13 pivoted to the support 10. The collar 12 is pivotally connected by the links 14 with the sliding lock members 6 on the disk 4. It will be evident that by shifting the collar 12 longitudinally of the hub 8 the lock members 6 may be actuated so as to move radially either outwardly or inwardly on the disk 4. Said lock members 6 may thus be engaged with or disengaged from the teeth 5ᵇ of the pulley 5.

In the operation of the invention when it is desired to connect the pulley 5 with the shaft 1 the lever 9 is first operated so as to shift the disk 4 toward the pulley 5 until the friction surfaces 5ᶜ and 4ª engage, the pulley being thus practically clamped between the members 3 and 4. The friction driving connection will thus be established between the pulley 5 and the shaft 1. After the pulley has been thus connected with the shaft, and just prior to placing the load on the pulley the lever 13 is shifted so as to cause the collar 12 to move toward the disk 4 and this connection forces the locking members 6 outwardly into engagement with the teeth 5ᵇ. The pulley 5 is thus connected positively for rotation with the driving shaft 1. The positions of the levers 9 and 13 may be maintained by means of pins 15 adapted to pass through the outer ends of the levers and enter any one of a series of openings provided in supports 16 adjacent to the support 10.

It will be noted that the friction driving connection and the positive driving connection between the pulley 5 and the shaft 1 are established by independently operable devices. Of course, in disconnecting the pulley 5 of the shaft 1 the positive clutch devices are first disengaged after which the friction surfaces are separated. The outermost ends of the locking members 6 are pointed or beveled and the inner ends of the teeth 5$^b$ are similarly formed to facilitate the engagement of these parts in an obvious manner. Whenever necessary the friction surfaces 4$^a$ and 5$^c$ may be renewed. Furthermore, it is to be noted that in addition to the bearing of the hub of the pulley 5 on the sleeve 2, the inner surface 5$^d$ of the rim 5$^a$ has bearing upon the outer periphery 3$^a$ of the rim 3. By this construction when the pulley 5 is running idly the tendency for the hub to wear excessively upon the sleeve 2, and thereby cause jumping and wabbling, is prevented.

Having thus described the invention, what is claimed as new, is:

In a clutch of the class described, and in combination, a driving shaft, a hub keyed thereon and formed with an integral outwardly projecting friction rim, a hub keyed to the first mentioned hub and formed with an outwardly projecting friction disk, a pulley loosely mounted upon the first mentioned hub and having its rim extending over the friction disk and formed with internal teeth for coöperation therewith, the adjacent sides of the pulley and friction disk being formed with friction surfaces, sliding locking members on the outer surfaces of the friction disk for engagement with the teeth of the pulley, the adjacent ends of the locking members and teeth being pointed, a collar loosely mounted on the hub of the friction disk, links connecting the collar and sliding locking members, a lever for shifting said loose collar to actuate the sliding locking members, and a second lever operatively connected with the hub of the friction disk for carrying said disk into engagement with the loose pulley and the friction rim of the first mentioned hub.

In testimony whereof I affix my signature in presence of two witnesses.

ORVILLE E. LUTZ.

Witnesses:
GEORGE CLAYTON, Jr.,
GILBERT FONSTAD.